United States Patent
Carlsson

[15] 3,653,424
[45] Apr. 4, 1972

[54] METHOD AND APPARATUS FOR CONCENTRATING SOLUTIONS OR SUSPENSIONS OR FOR RECOVERING THE DRY SUBSTANCE THEREOF

[72] Inventor: Eric Harald Carlsson, Planteringsvagen 7B, 26200 Angelholm, Sweden

[22] Filed: Oct. 30, 1969

[21] Appl. No.: 872,635

[30] Foreign Application Priority Data

Oct. 31, 1968 Sweden..............................14751/68

[52] U.S. Cl..................................159/16, 117/100, 261/96, 159/49
[51] Int. Cl. ....................B01d 1/14, B05c 7/14, B01d 47/16
[58] Field of Search...................159/16 FB, 21 Q, 25 A, 47, 159/47 WL, 48; 118/62, 303; 117/100 C, 100 B, 100 M, 100 S; 263/19 B; 203/49, 89, 100; 23/272.6, 288.3; 259/24, 44, 67, 108; 165/107; 261/94-96, 98

[56] References Cited

UNITED STATES PATENTS

| | | | |
|---|---|---|---|
| 2,199,670 | 5/1940 | Lowry | 23/272.6 X |
| 2,507,105 | 5/1950 | Howard et al | 23/288.3 X |
| 2,536,254 | 1/1951 | Beckberger | 196/52 |
| 2,561,394 | 7/1951 | Marshall | 159/48 |
| 2,755,749 | 7/1956 | Seymour | 110/7 |
| 2,905,596 | 9/1959 | Findlay | 203/89 X |
| 2,702,091 | 2/1955 | Smith, Jr. | 165/107 X |
| 3,242,975 | 3/1966 | Kogan | 165/2 |
| 3,266,556 | 8/1966 | Malek | 159/16 |
| 3,442,769 | 5/1969 | Heinz | 203/7 |
| 2,842,193 | 7/1958 | Ballestra | 159/4 D |

Primary Examiner—Norman Yudkoff
Assistant Examiner—J. Sofer
Attorney—John Lezdey

[57] ABSTRACT

A method and an apparatus for subjecting a liquid containing dissolved or suspended dry substance to treatment with air to concentrate the solution or the suspension or to recover the dry substance. The liquid is spread and distributed onto a great many bodies in the form of partly interengaging spheres or polyhedrons, whereby the air can flow forth between the bodies. The bodies are caused to move in a closed path and also in relation to each other thereby disturbing the liquid film on the bodies and accelerating the escape of the liquid in gaseous form and ensuring loosening of the dry substance from the bodies.

4 Claims, 3 Drawing Figures

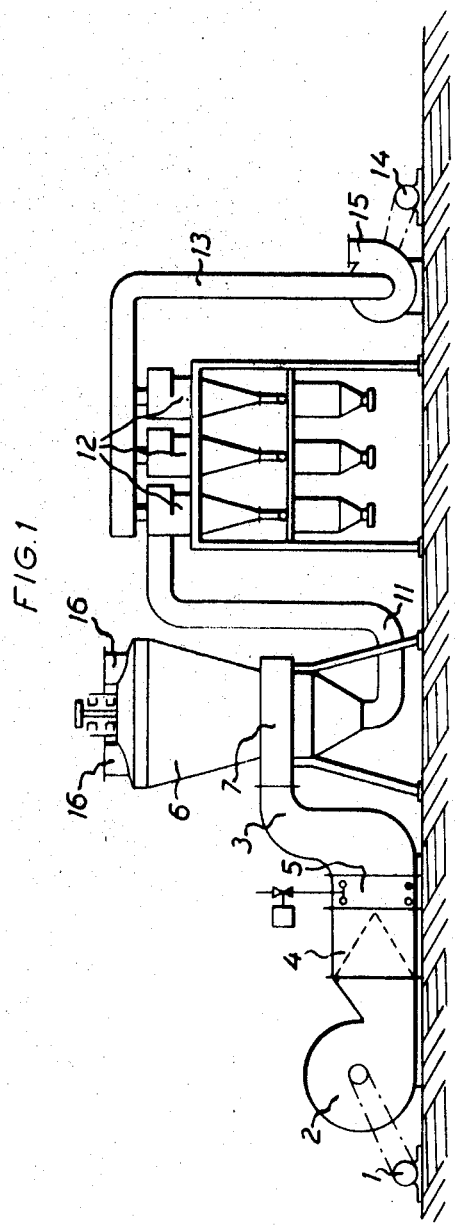

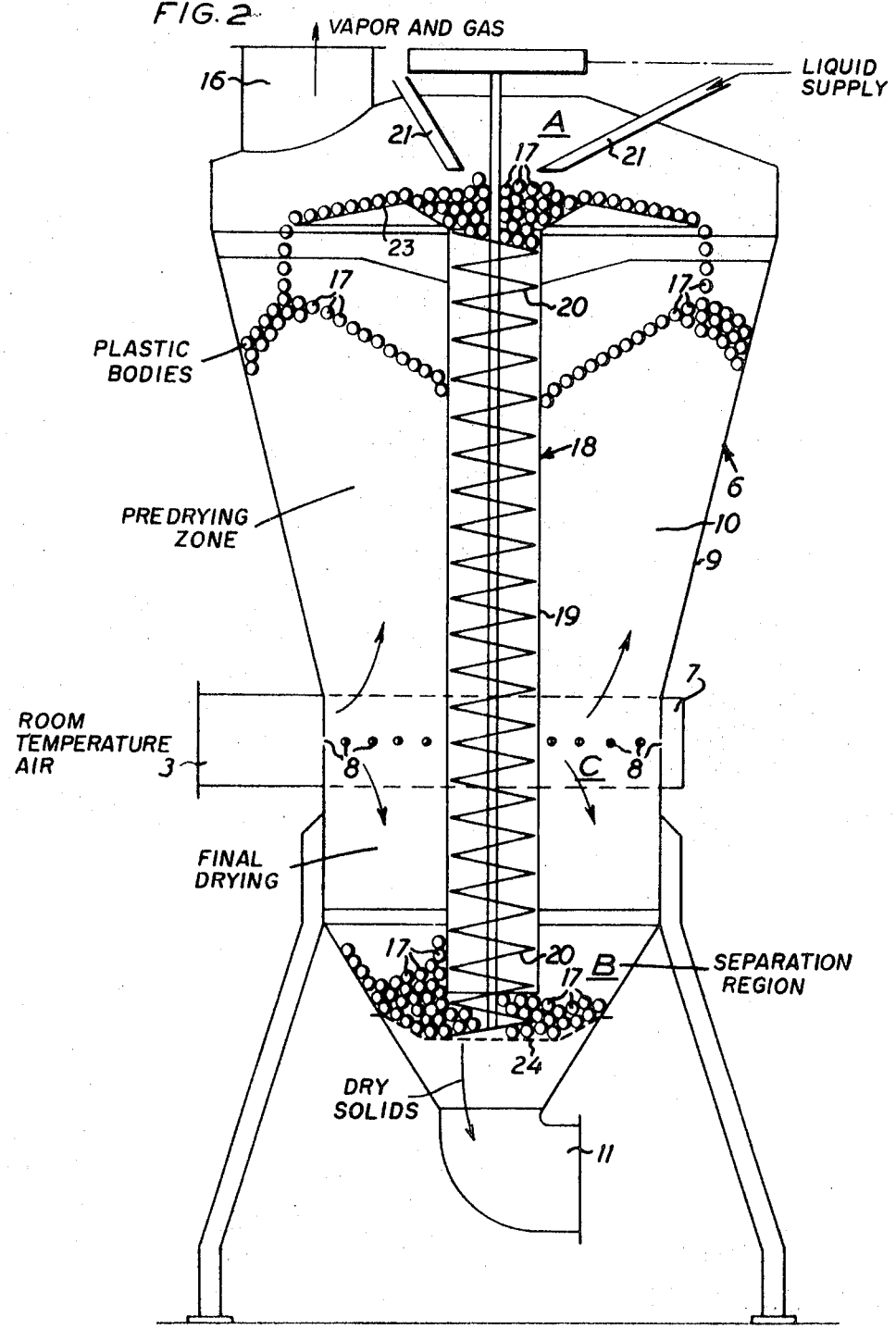

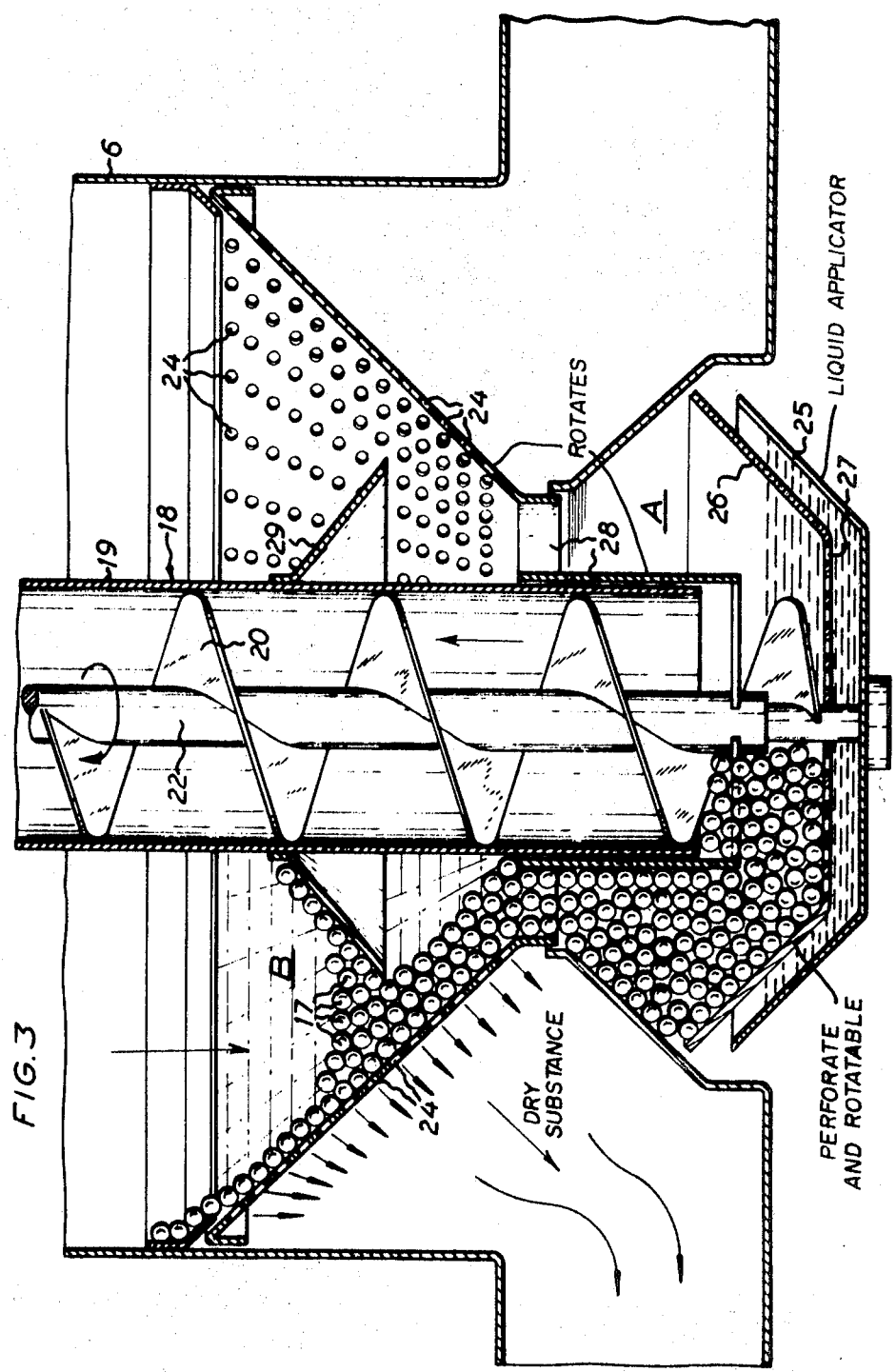

METHOD AND APPARATUS FOR CONCENTRATING SOLUTIONS OR SUSPENSIONS OR FOR RECOVERING THE DRY SUBSTANCE THEREOF

This invention relates to a method and an apparatus for subjecting a liquid containing dissolved or suspended dry substance to treatment with gas, such as air, in which the liquid at a liquid application point is distributed onto a great many bodies in the form of partly interengaging spheres or polyhedrons, so that the liquid is spread and distributed as thin films on the surfaces of the bodies at the same time as the gas, such as air, is allowed to flow forth in the interstices between the bodies, and the bodies are caused to move relative to each other so that the bodies disturb the liquid films by their interengagement and relative movements.

U.S. Pat. No. 2,400,810 to Clarke et al. of Jan. 18, 1944 describes and shows an apparatus for treating gases with liquids. To provide large surfaces of contact between the gas and the liquid the apparatus has a great many bodies in the form of spherical bodies or polyhedrons which occupy a relatively stationary position in the apparatus, that is, they cannot be moved for example from one end of the container to the other end thereof. By means of an agitator, however, the bodies can be caused to move relative to each other. This apparatus presupposes a gravity flow of the liquid and the gas through the apparatus, and it does not provide any possibility of producing and recovering a thickly flowing liquid or dry substance.

For the recovery of dry substances from solutions or suspensions use is at present made of methods and apparatus that are relatively complicated and therefore imply high purchase and operating costs. In most of the prior art methods and apparatus, relatively high temperatures are utilized to gasify the liquid and to remove it from the dry substance. Some dry substances cannot be recovered without taking on for example a burnt taste or coagulating, as is the case with albumen.

The invention has for its object to eliminate the deficiencies outlined above, and to this end it is characterized in that the relative movements of the bodies are realized by causing the bodies to move continuously in a closed path through the gas supply point, the liquid application point and a separating point at which the concentrated solution, the concentrated suspension or the dry substance can be continuously withdrawn.

The invention will now be described more in detail with reference to the accompanying drawings in which:

FIG. 1 is a diagrammatic view of the apparatus according to the invention and some auxiliary apparatus;

FIG. 2 is a more detailed longitudinal section of the apparatus;

FIG. 3 is a partial section of a modified embodiment of the apparatus.

The apparatus illustrated in FIG. 1 comprises a fan 2 which is driven by a motor 1 and connected to a main conduit 3 having an air filter 4 and a heat exchanger 5 in which the air flowing through the main conduit 3 can be heated to the appropriate temperature. The heat exchanger 5 can be disconnected when very sensitive products are to be treated so that air of room temperature or less flows through the main conduit 3 to a container 6 constituting the apparatus according to the invention. To this end, the main conduit 3 is connected to a passage 7 extending around the container 6 and communcating with the hollow interior 10 thereof through a number of holes 8 in the container wall 9. A conduit 11 extends from the lower end of the container 6, and when—as in the present case—the intention is to recover dry substance from a liquid, said conduit 11 is connected to a number of cyclones 12 for separating the dry substance from the drying air which escapes into the atmosphere via an air conduit 13 and a suction fan 15 driven by the motor 14. The drying air which is saturated with the gas from the liquid, also leaves the container 6 through conduits 16.

A great many partly interengaging bodies 17 in the form of spheres or polyhedrons are packed into the container 6 so as to fill it almost completely. The bodies 17 can be of any desired diameter. Experiments have proved that spherical bodies can have a diameter of about 15 mm. Furthermore, the bodies may be of any desired material. Preferably, however, there is chosen a material which is deformable at least to some extent, a property which facilitates the removal of the dry substance from the bodies, as will appear from the following. Use can also be made of materials having good release capacity and from which the dry substance is released practically without any particular measures being taken. Bodies of certain plastics materials or plastic-coated metals thus are most suitable. The container 6 also has a conveying means 18 which in the embodiment illustrated comprises a housing 19 and a screw 20 which is rotatable about its longitudinal axis. The conveying means 18 extends between a point A at the upper part of the container where liquid is supplied to the bodies 17, and a point B in the lower part of the container where concentrated liquid or, as in the embodiment illustrated, dry substance is separated from the bodies. As will appear from the drawings, the container 6 tapers from the liquid application point A towards the separating point B. For the application of the liquid one or more conduits extend into the upper part of the container to open above the upper end of the conveying means 18, the conduits being connected to a supply (not shown) of a solution or a suspension the dry substance of which is to be recovered. The shaft 22 of the screw 20 is connected to a suitable power source (not shown). The end of the housing 19 located at the liquid application point A has a collar 23 for spreading the bodies 17 supplied by the conveying means 18 to the liquid application point A. At the separating point B the container 6 has a perforated bottom 24 through which the dry substance can leave the container 6 and from which the bodies are returned to the liquid application point A. For controlling the air streams flowing through the container 6 and the interstices between the bodies 17 the conduits 16 and 13 can present valves (not shown). Moreover, the holes 8 can have connected to them tubular pieces (not shown) by means of which the drying air is carried some distance in between the bodies 17 in the container 6. The tubular pieces can have different lengths so that a favorable distribution of the air stream is realized in the container 6.

The solution or suspension which is taken from the supply (not shown) and carried through the conduits 21 onto the upper layers of the bodies 17, to some extent flows down into the conveying means 18 to a level determined by the upward movement of the bodies 17, which is imparted to them by the conveying means. The solution or suspension is distributed in the form of thin films on the bodies 17. Drying air flows from the fan 2 through the filter 4, the heat exchanger 5 and the main conduit 3 to the passage 7 encircling the container 6 and leaves said passage through the holes 8 in the container wall 9 and is thereby introduced into the container 6 at the gas supply point C. The drying air flows into the hollow interior 10 of the container 6 in a region between the liquid application point A and the separating point B and is divided into a part stream directed to the liquid application point A and a part stream directed towards the separating point B. The air streams flow forth in the interstices between the bodies moving downwardly in the hollow interior 10 of the container, and because of their shape they will but partly engage each other. The conveying means 18 grasps the bodies 17 which have reached the perforated bottom 24 and carries them through the housing 19 to the liquid application point A where they are distributed in the hollow space 10 of the container by means of the collar 23. The bodies 17 slowly sink downwards in the container 6 and the hollow interior 10 thereof while being constantly swept by the drying air flowing through the interstices between the bodies 17, said drying air evaporating the liquid and carrying away the gas through the conduits 13 and 16. As the bodies 17 in the course of their movement from the upper part of the container 6 to the lower part thereof constantly change positions and constantly disturb the liquid films by their interengagement and relative movements, the evaporation is facilitated and finally the dry substance forming on the surfaces of the bodies 17 will come loose from them. The tapering form of the container results in a further relative shifting of the bodies, which favorably affects the drying operation. By selecting a temperature for the drying air or drying gas, which is suitably adapted to the nature of the material to be treated it is possible to provide a rapid and efficient drying which yields a dry substance hitherto unsurpassed in quality.

In the above described embodiment of the invention the bodies 17 are caused to move in a closed path through the liquid application point A, the separating point B and the gas supply point C. At the separating point B the concentrated solution, the concentrated suspension or dry substance, is continuously withdrawn. In the closed path the bodies 17 move forward from the liquid application point A past the gas supply point C to the separating point B and move back in a return movement from the separating point B to the liquid application point A. In this instance the forward movement is commenced at the liquid application point A and the return movement is concluded at the same point A.

A course of operation which is more advantageous in certain cases is attained if—as shown in FIG. 3—the forward movement is concluded at the liquid application point A and the return movement is commenced at the same point A. In this embodiment of the apparatus of the invention both the liquid application point A and the separating point B are located at the lower ends of the container 6 and the screw 20 so that the liquid application point A is in direct communication with the conveyor screw 20 and the separating point B is in communication with the conveyor screw 20 via the liquid application point A. The liquid application point A comprises a vessel 25 which is open in an upward direction towards the lower ends of the conveyor screw 20 and the container 6. A container portion 26 which can be caused to rotate by means of the conveyor screw 20 extends downwards into the vessel 25. The bottom 27 of the container portion 26 in said vessel 25 is perforated so that liquid optionally supplied to the vessel 25 can flow into the container portion 26. Said movable container portion 26 also comprises the perforated bottom 24 of the container 6, which bottom forms the separating point B and through which the dry substance can leave the container. The withdrawal of the dry substance is facilitated and accelerated by the fact that the bottom 24 is also set in motion. The container portion 26 is connected to the shaft of conveyor screw 20. The perforated bottom 24 is connected to the screw by means of angularly bent arms 28. The housing 19 has a conical collar 29 which guides the bodies 17 towards the bottom 24. This arrangement will produce an improved separation of the dry substance from the bodies 17 and also a more uniform distribution of the liquid on the bodies 17.

What is claimed is:

1. An apparatus for carrying out the method of subjecting a liquid containing dissolved or suspended solids to a drying operation by heated dry gas, comprising a vertically axised container for accommodating numerous interengaging bodies; gas supply means intermediate the container for sweeping said bodies, a gas and vapor outlet at the top of the container; a conveying means comprising a vertical screw on said axis which can be caused to rotate about its longitudinal axis in a closely circumscribing housing said bodies filling the container and housing; a liquid application region comprising a vessel below the lower end of the screw and open in an upward direction and diverging towards the lower ends of the screw of said conveying means and said container, a liquid distributing means at the upper end of the screw and a separate inverted trapezoidal container portion which is rotatable together with said screw of said conveying means and extends downwards into said vessel, the bottom of said container portion in said vessel being perforated, whereby the liquid at the application region is distributed onto a great number of said interengaging bodies in the form of spheres or polyhedrons and the bodies are caused to move relative to each other so as to disturb the liquid films formed thereon by their interengagement and relative movements, a dry solids removal outlet at the lower end of said container wherein said conveying means is disposed in said container and serves to return said bodies in a direction from the lower end of said container to the upper end thereof within said housing and from which said bodies while moving downward by gravity successively travel to the lower end of said container, moving past said gas supply point, said liquid application region and said solids removal outlet.

2. An apparatus for drying solids dissolved or suspended in a liquid, comprising:
   a great number of partly interengaging bodies,
   a vertical container for said bodies,
   a conveyor coaxial with said container to advance said bodies from the lower end to the upper end of said container and to permit said bodies to move by gravity from the upper end to the lower end of said container. Said conveyor comprising a shroud separating the ascending and descending bodies.
   means to supply said liquid to the upper end of said container, said supplying means being arranged to discharge the liquid in the upper end of said conveyor,
   means to distribute said liquid onto said bodies,
   heated dry gas supplying means connected to said container in a region spaced between the upper and lower ends of said container, to sweep the descending bodies
   solid separating means at the lower end of said container, to remove dried solids from the descending bodies
   means connected to the upper end of said container for carrying away gas and vapor from the container,
   fan means connected to the lower end of said container for carrying away the separated solids,
   and means to distribute the bodies over the cross sectional area of said container at the upper end of the container.

3. A method for drying liquids containing solids dissolved or suspended in a liquid, comprising the steps of:
   advancing a great number of partly interengaging bodies through a raising part and a falling part of a closed path,
   distributing said liquids onto said advancing bodies in that area of the path where the rising part merges with the falling part and the advance of the bodies still is essentially upwardly directed so that said liquids are spread in the form of thin films on the surfaces of said bodies,
   supplying a heated dry gas stream in the interstices between the bodies in the falling part of the path,
   dividing the heated dry gas stream into two part streams,
   guiding one of said streams in counterflow relationship to the advance of said bodies in the falling part of the path and towards the distributing area,
   guiding the other of said streams in the flow direction of the advance of said bodies in the falling part of the path and from the distributing area,
   and separating the resulting solids in that area of the closed path where the falling part merges in the rising part.

4. The method of claim 3 wherein said bodies have a plastic surface.

* * * * *